(12) United States Patent
Ruchti

(10) Patent No.: US 11,731,577 B2
(45) Date of Patent: Aug. 22, 2023

(54) PASSENGER PROTECTION FOR A MOTOR VEHICLE

(71) Applicant: ZF Friedrichshafen AG, Friedrichshafen (DE)

(72) Inventor: Martin Ruchti, Langenargen (DE)

(73) Assignee: ZF FRIEDRICHSHAFEN AG, Friedrichshafen (DE)

(*) Notice: Subject to any disclaimer, the term of this patent is extended or adjusted under 35 U.S.C. 154(b) by 0 days.

(21) Appl. No.: 17/767,360

(22) PCT Filed: Oct. 5, 2020

(86) PCT No.: PCT/EP2020/077855
§ 371 (c)(1),
(2) Date: Apr. 7, 2022

(87) PCT Pub. No.: WO2021/069380
PCT Pub. Date: Apr. 15, 2021

(65) Prior Publication Data
US 2022/0371535 A1 Nov. 24, 2022

(30) Foreign Application Priority Data
Oct. 10, 2019 (DE) .................... 10 2019 215 534.0

(51) Int. Cl.
*B60R 21/214* (2011.01)
*B60R 21/015* (2006.01)
*B60R 21/231* (2011.01)

(52) U.S. Cl.
CPC ...... *B60R 21/214* (2013.01); *B60R 21/01538* (2014.10); *B60R 2021/23107* (2013.01); *B60R 2021/23161* (2013.01)

(58) Field of Classification Search
CPC .......... B60R 21/214; B60R 21/01538; B60R 2021/23107; B60R 2021/23161; B60R 2021/0037; B60R 2021/0067
See application file for complete search history.

(56) References Cited

U.S. PATENT DOCUMENTS 2,834,606 A * 5/1958 Bertrand ............... B60R 21/268
D12/400
4,213,636 A 7/1980 King
(Continued)

FOREIGN PATENT DOCUMENTS

DE 100 38 720 A1 2/2002
DE 10 2017 213 617 A1 2/2019
(Continued)

OTHER PUBLICATIONS

Computer generated English translation of DE-102018204149-A1 from Espacenet (Year: 2022).*
(Continued)

*Primary Examiner* — Paul N Dickson
*Assistant Examiner* — Tiffany L Webb
(74) *Attorney, Agent, or Firm* — Crowell & Moring LLP

(57) ABSTRACT

A device for protecting a person standing in a motor vehicle comprises numerous airbags installed in a motor vehicle, a scanner for determining where there is empty space adjacent to the person, and a control unit that is configured to only deploy those airbags that inflate into the empty space that has been determined.

16 Claims, 3 Drawing Sheets

(56) References Cited

U.S. PATENT DOCUMENTS

Figure 1:
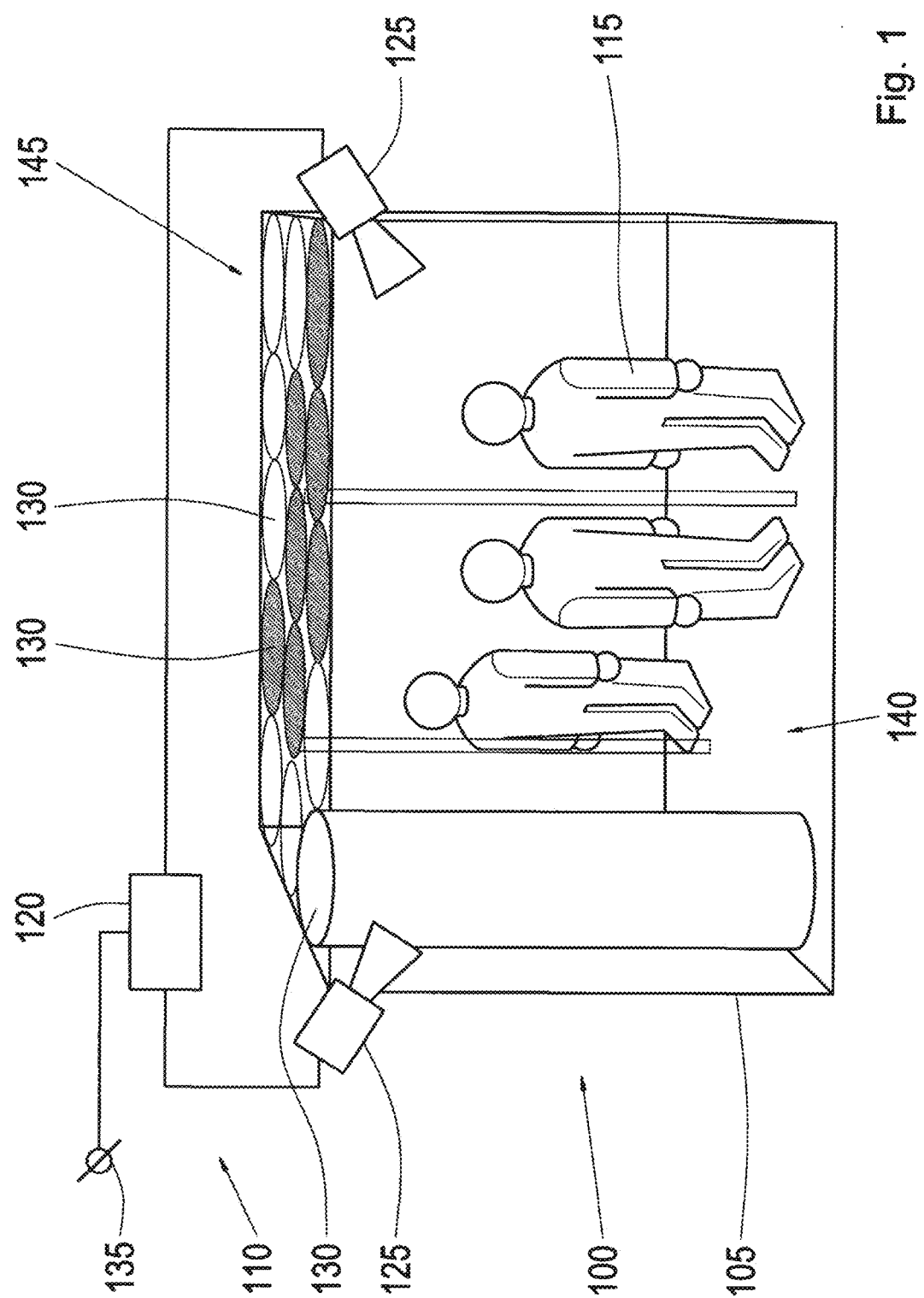

| | | | |
|---|---|---|---|
| 7,726,684 B2 * | 6/2010 | Breed | B60R 21/239 |
| | | | 280/743.1 |
| 9,771,043 B2 * | 9/2017 | Soules | B60R 21/0132 |
| 2018/0165585 A1 | 6/2018 | Saxena et al. | |
| 2018/0361981 A1 | 12/2018 | Faruque et al. | |
| 2022/0063537 A1 * | 3/2022 | Lee | B60R 21/231 |
| 2022/0080917 A1 * | 3/2022 | Sakurai | B60R 21/01554 |

FOREIGN PATENT DOCUMENTS

| | | | |
|---|---|---|---|
| DE | 102018204149 A1 * | 9/2019 | |
| DE | 10 2019 215 534.0 | 10/2019 | |
| DE | 10 2018 207 834 A1 | 11/2019 | |
| EP | 1632407 A2 | 3/2006 | |
| EP | 2956739 A2 | 12/2015 | |
| EP | 3141436 A1 | 3/2017 | |
| WO | WO 2014/149272 A2 | 9/2014 | |
| WO | WO 2021/069380 A1 | 4/2021 | |
| WO | WO-2022174852 A1 * | 8/2022 | |

OTHER PUBLICATIONS

Search Report in Corresponding German Application No. 10 2019 215 534.0 dated Oct. 15, 2020 (10 pages).

International Search Report and Written Opinion of the International Search Authority dated Nov. 30, 2020 in International Application No. PCT/EP2020/077855 (English and German languages) (10 pages).

* cited by examiner

PASSENGER PROTECTION FOR A MOTOR VEHICLE

CROSS-REFERENCE TO RELATED APPLICATIONS

This application is a U.S. national stage application under 35 U.S.C. § 371 of PCT Application No. PCT/EP2020/077855, filed on Oct. 5, 2020, and published as WO 2021/069380 A1 on Apr. 15, 2021, which claims priority from German Application No. DE 10 2019 215 534.0, filed on Oct. 10, 2019, the entirety of which are each hereby fully incorporated by reference herein.

The present invention relates to protection for passengers in a motor vehicle. In particular, the invention relates to protection in public transportation.

A person in a motor vehicle can be protected against injury in an accident when an airbag (also referred to as a collision cushion) is quickly deployed between the person and an inner wall of the motor vehicle and is filled with gas during or prior to a collision with an obstacle by the motor vehicle. When the person comes in contact with the airbag, the gas contained therein can be discharged by a valve in a controlled manner, such that the movement of the person is decelerated.

Airbags are primarily known for drivers and passengers in passenger automobiles. Special airbags have been developed for the head, pelvis and knee regions of passengers, for example. Some airbags are conceived for a front-end collision, and others have been conceived for side impacts. To ensure that the protection is adequate, the precise position of the person must normally be known. Body size, weight, or the posture of the person at the moment of impact may also be reflected in the design of the airbag. A difference between reality and the assumptions may reduce the effectiveness of the airbag in providing protection.

Public transportation normally does not provide airbags for passengers. These vehicles are operated with a wide variety in the number of passengers at any one time. Some people may be seated, while others are standing, such that it is impossible to determine their precise position or posture. These people may be exposed to greater risks in the event of an abrupt driving maneuver, such as emergency braking or sudden changes in direction.

The fundamental object of the present invention is to create an improved technology for protecting standing passengers in a motor vehicle. The invention achieves this object by means of the subject matter of the independent claims. The dependent claims describe preferred embodiments of the invention.

A device for protecting a standing passenger in a motor vehicle comprises numerous airbags installed in the motor vehicle, a scanner for determining where there is empty space next to a person, and a control unit designed to only deploy those airbags that can be inflated in the empty spaces that have been detected.

The device can deploy the airbags in particular when a conventional airbag would also be deployed, e.g. when a collision with another object is impending or takes place, or if the motor vehicle rolls. Standing passengers can be better protected by a dynamic deployment of only those airbags that can be inflated in an empty space. The device can also contribute to the protection of numerous people on board a motor vehicle. Airbags can be deployed between individuals, or between an individual and the interior wall of the vehicle where the person is located. The device can be used in particular on public transportation with space for standing, which may or may not be occupied. The motor vehicle can be a bus or a train, for example.

The airbags can be designed such that they are deployed vertically. As a result, they can inflate more effectively in the space surrounding an individual, in order to provide a better form of protection. In a first variation, the airbags are installed in the floor of the motor vehicle, such that they are deployed upward.

In a second variation, the airbags are installed in a region above the individuals, and are deployed downward.

By way of example, the airbags can be installed in the ceiling of the motor vehicle interior. There is sufficient structural space there in which the airbags can be installed. The individual's head can be particularly effectively protected when the airbag is deployed from above. An empty space that only exists at a predetermined height above the floor, e.g. above luggage or a child, can be filled dynamically by an airbag that is only partially inflated.

It is particularly preferred that the airbags are in a horizontal arrangement, which may comprise numerous airbags. This airbag arrangement can follow a predetermined pattern, e.g. in the form of a matrix or a honeycomb pattern, such that an empty space can be filled by one or more airbags deployed in a particularly flexible and precise manner. A region that cannot be occupied by a standing individual, e.g. where a seat is located, has no airbags. The airbags are normally all the same size, although airbags of different sizes can also be used. The dimensions of the airbags may differ, for example, in the vertical and/or horizontal direction.

In one embodiment, a deployed airbag takes up approximately the same amount of space as a person standing in the same place. It can be assumed that the overall volume of the airbags is the same as that when the motor vehicle contains the maximum number of standing passengers. As a result, the number of airbags can be such that adequate protection is provided for any number of passengers with a minimum number of airbags.

The control unit can be designed to deploy airbags when a horizontal acceleration of the motor vehicle exceeds a first predetermined threshold value. The acceleration can be determined in particular as that resulting from a collision by the motor vehicle with another object. If the collision can be anticipated, the airbags can be deployed immediately prior thereto.

In another embodiment, the control unit is designed to deploy an airbag if the motor vehicle is to execute a predetermined driving maneuver. The predetermined driving maneuver may involve acceleration horizontally, exceeding a second predetermined threshold value. The second threshold value may be the same as the first, or lower. By way of example, an avoidance maneuver, quick lane change, or emergency braking may take place, without the risk of injuring the individuals on board the motor vehicle due to the acceleration associated therewith. A substantially greater acceleration that might occur if the maneuver is not carried out, may be prevented in some circumstances. A limiting of the dynamics of the motor vehicle such that accelerations do not exceed another predetermined threshold value may not be necessary.

In another embodiment, the airbags are connected to one another. This results in a single integral airbag, which can be deployed at various locations to different extents. The individual airbags can be connected to one another, in particular, or be placed behind a large tarp or inside a large cushion.

According to another aspect of the invention, a motor vehicle comprises the device described herein.

According to another aspect of the present invention, a method for protecting individuals standing in a motor vehicle comprises steps in which: the interior of the vehicle is scanned, empty spaces adjacent to individuals are determined, it is determined which airbags are to be deployed in these empty spaces, and the airbags are deployed.

The method can also be designed to be executed entirely or in part on the control unit described herein. This control unit can comprise a programmable microcomputer or microcontroller for this, and the method can be in the form of a computer program containing program code. The computer program can also be stored on a computer-readable data medium. Features or advantages of the method can be attributed to the device, or vice versa.

The invention shall now be described more precisely in reference to the drawings. Therein:

FIG. 1 shows a system;
FIG. 2 shows an exemplary arrangement of airbags; and
FIG. 3 shows a flow chart for the method.

FIG. 1 shows a schematic illustration of a motor vehicle 100 that has an interior 105, in which a device 110 is installed in the motor vehicle 100. The motor vehicle 100 is designed to transport one or more standing individuals 115. Other individuals 115, not shown, can also be transported while sitting or lying down. The motor vehicle 100 can be a vehicle for public transportation, in particular, e.g., a city bus or a train on rails.

The device 110 is designed to protect the standing individuals 115 from injury. The device 110 comprises a control unit 120 for this, which is connected to at least one scanner 125 for scanning the interior 105, and numerous airbags 130. There may also be an interface 135, which can be connected to another device on board the motor vehicle 100. A signal can be received via the interface 135, which indicates an existing or immediately impending acceleration of the motor vehicle 100. If the acceleration exceeds a predetermined threshold value, the at least one individual 115 can be actively protected by the device 110.

An airbag 130 is designed to be installed in a predetermined location in the motor vehicle 100, and comprises a bag or cushion, which is initially compressed into a compact form. If the airbag is deployed, a gas generator is triggered, which normally functions pyrotechnically. The gas generator quickly inflates the airbag, and the airbag is designed such that it inflates in a predetermined manner, and in a predetermined direction. The inflated airbag can aid in preventing a person 115 from colliding with another other object in the interior by coming between that person 115 and the object. In one embodiment, the airbag contains a valve, which allows the airbag to deflate in a controlled manner when the person 115 is pressed against the airbag.

It is proposed that only those airbags 130 are deployed to actively protect the individual 115 that can inflate in an empty space adjacent to a person 115. Airbags 130 that are partially or entirely located above a person 115 should not be deployed. For this reason there are preferably numerous airbags 130, which can be organized in a predefined arrangement 145. The airbags 130 are also preferably designed to deploy vertically. In the embodiment shown here, the arrangement 145 is located above the people 115, and can be integrated in the ceiling of the motor vehicle 100, for example, such that the airbags 130 to inflate downward.

The horizontal dimensions of an inflated airbag 130 can be similar to that of a person 115. The arrangement 145 shown here comprises enough airbags 130 to completely fill a predetermined part of the interior 105 where individuals 115 can stand while the motor vehicle 100 is underway. By way of example, it is assumed that an inflated airbag 130 is basically cylindrical. The illustration therefore shows an inflated airbag 130 in this form. Other shapes of an airbag 130 are also conceivable.

To determine which airbags 130 are above an empty space 140, the interior 105 can be scanned by at least one scanner 125. A scanner 125 preferably functions in a contactless manner, and can comprise, e.g., a camera, a 3D camera, a LIDAR sensor, or a radar sensor. Various scanners 125 can be installed in different locations in the interior 105, in order to obtain a three dimensional model of the interior, showing the locations of the individuals 115 therein. It is then possible to determine which airbags 130 are located above empty space 140 on the basis of the model.

Alternatively, each airbag 130 can have a dedicated scanner 125, which then scans the portion of the interior 105 lying below its airbag 130. The scanner 125 can comprise a distance meter, directed vertically downward. If the distance that is measured corresponds to the distance between the floor of the interior 105 and the airbag 130, then the airbag 130 must be over empty space 140. The distance meter can have a relatively simple construction and function with ultrasound or optically. An airbag 130 can also have numerous distance meters for scanning the space that would be filled by the inflated airbag 130 as completely as possible.

The airbags 130 located above empty space in FIG. 1 are indicated by unshaded circles, and the airbags 130 that are at least partially above an individual 115 are indicated by circles that are shaded in. If the individuals 115 are to be protected for some reason, the unshaded airbags 130 can be deployed, such that they inflate between individuals 115 or between an individual 115 and the walls of the interior 105. In another embodiment, only those airbags 130 that are in the space toward which a person 115 would be accelerated can be deployed.

Figure 2A:
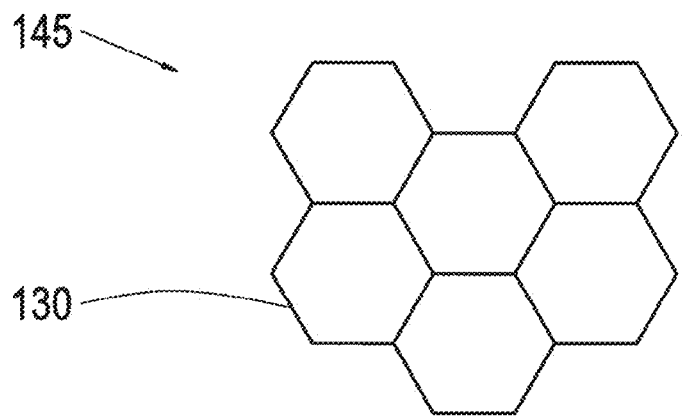

FIG. 2 shows exemplary arrangements 145 of airbags 130 from above. FIG. 2a shows a honeycomb arrangement 145, in which the airbags 130 have a horizontal hexagonal shape when they are not inflated, and can fit together without gaps. This embodiment enables a particularly high horizontal packing density of the airbags 130.

Figure 2B:
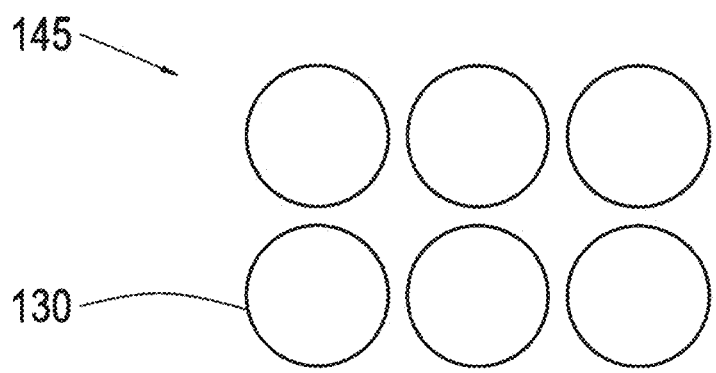
Figure 3:
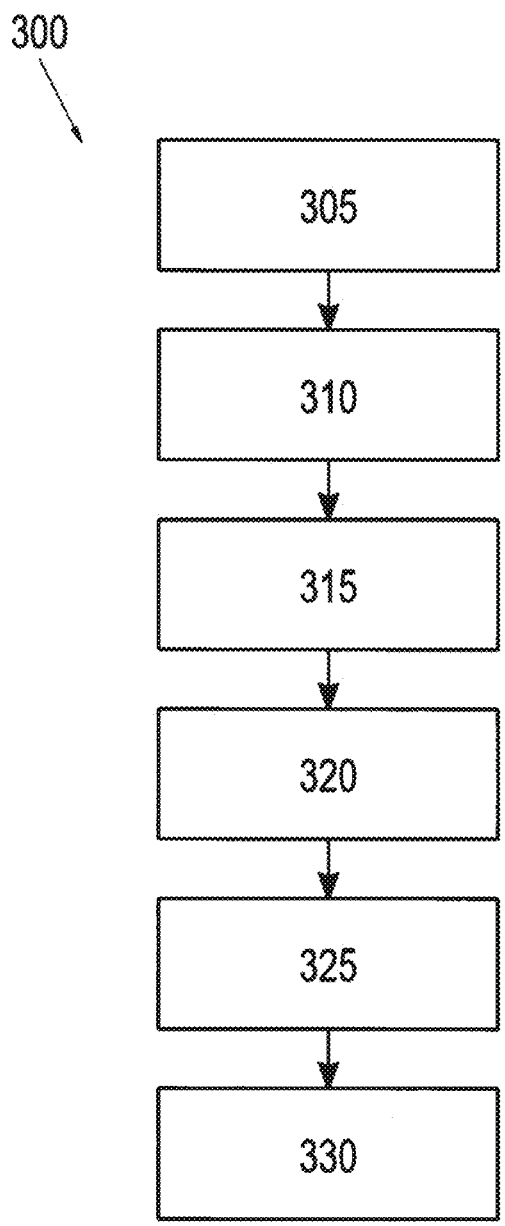

FIG. 2b shows a matrix-shaped arrangement 145. By way of example, the airbags 130 have a circular cross section in this embodiment. There may be unused space between the airbags 130 in this arrangement, although this may also simplify the determination of which airbags 130 are to be deployed, due to the matrix-shaped arrangement.

Figure 2C:
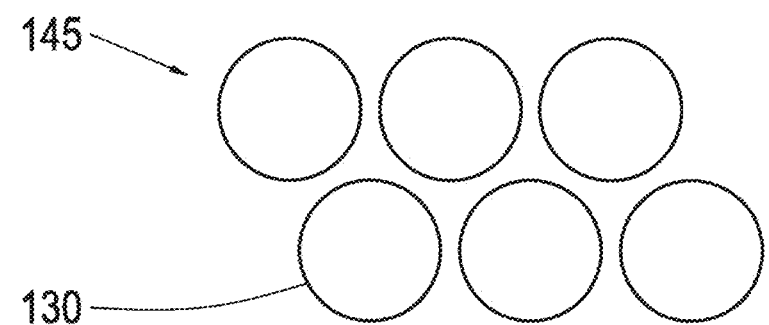

FIG. 2c shows an offset matrix-shaped arrangement 145, which combines the advantages of the embodiments shown in FIGS. 2a and 2b.

FIG. 3 shows a flow chart for a method 300 for protecting standing individuals 115 on board a motor vehicle 100. A driving situation for the motor vehicle 100 can be determined in a first step 305. The driving situation can be a movement of the motor vehicle 100 in relation to a surface, in particular a predetermined road surface. If the motor vehicle 100 threatens to leave the road surface, it may experience a strong acceleration. The driving situation can also comprise an impending or existing collision of the motor vehicle 100 with another object. The driving situation can also comprise an impending or executed driving maneuver, which may involve a strong longitudinal and/or lateral acceleration of the motor vehicle 100.

It can be determined in a second step 310 whether an acceleration that is stronger than a predetermined acceleration is acting on the motor vehicle 100, or such an acceleration is impending. The speed of the motor vehicle 100 can be used to determine the extent of the acceleration. A higher speed can result in a greater acceleration acting on an individual 115 on board the motor vehicle 100.

The interior 105 of the motor vehicle 100 can be scanned in a third step 315. Empty space 140 in the interior 105 can be determined on the basis of the scanning in a fourth step 320, in which an empty space 140 contains no individuals 115. Which airbags 130 are to be deployed into the empty space 140 can be determined in a fifth step 325. It should be noted that one or more of the steps 315-325 can also be carried out prior to the second step 310.

If it is determined in the second step 310 that an excessive acceleration is to be expected, certain airbags 130 can be deployed in the fifth step 325. This deployment can take place immediately, or the time at which they are deployed can depend on an anticipated acceleration or selected on the basis of a determined driving situation.

REFERENCE SYMBOLS 100 motor vehicle
105 interior
110 device
115 person
120 control unit
125 scanner
130 airbag
135 interface
140 empty space
145 arrangement
300 method
305 determining the driving situation
310 impending or occurring acceleration?
315 scanning of interior
320 determining empty space
325 determining which airbags are assigned thereto
330 deploying specific airbags

The invention claimed is:

1. A device for protecting a person standing in a motor vehicle, the device comprising:
   a plurality of airbags installed in the motor vehicle in a horizontal arrangement such that, in a longitudinal direction of the motor vehicle, at least two of the plurality of airbags are arranged adjacent to each other, and, in a lateral direction of the motor vehicle, at least two other of the plurality of airbags are arranged adjacent to each other, and wherein each of the plurality of airbags are individually deployable;
   at least one scanner configured to determine where empty space exists adjacent to the person, wherein the scanner comprises at least one of a camera, a 3D camera, a LIDAR sensor, a radar sensor, an ultrasound distance meter, or an optical distance meter; and
   at least one processing device configured to only deploy one or more airbags of the plurality of airbags that inflate in the empty space that has been determined.

2. The device according to claim 1, wherein the plurality of airbags are configured to inflate vertically.

3. The device according to claim 2, wherein the plurality of airbags are located in a region above the person and configured to inflate downward when deployed.

4. The device according to claim 1, wherein horizontal dimensions of one airbag of the plurality of airbags inflated in an empty space are approximately the same as horizontal dimensions of a person.

5. The device according to claim 1, wherein the at least one processing device is configured to deploy the one or more airbags in response to a horizontal acceleration acting on the motor vehicle exceeding a predetermined threshold value.

6. The device according to claim 1, wherein the at least one processing device is configured to deploy an airbag in response to an impending or executed predetermined driving maneuver.

7. A motor vehicle, comprising:
   the device according to claim 1.

8. The device according to claim 1, wherein the at least one scanner comprises a plurality of scanners, and wherein each one of the plurality of airbags has associated therewith at least one individual scanner of the plurality of scanners configured to scan a portion of an interior of the motor vehicle lying below the respective airbag.

9. The device according to claim 1, wherein the plurality of airbags are cylindrical or honeycomb shaped.

10. The device according to claim 1, wherein the horizontal arrangement is at least one of a matrix arrangement, an offset matrix arrangement, or a honeycomb arrangement.

11. A method for protecting a person standing in a motor vehicle, the method comprising:
    scanning, with a scanner, an interior of the motor vehicle, wherein the scanner comprises at least one of a camera, a 3D camera, a LIDAR sensor, a radar sensor, an ultrasound distance meter, or an optical distance meter;
    determining an empty space adjacent to the person;
    determining at least one airbag of a plurality of airbags in the motor vehicle to inflate in the determined empty space, wherein the plurality of airbags are installed in the motor vehicle in a horizontal arrangement such that, in a longitudinal direction of the motor vehicle, at least two of the plurality of airbags are arranged adjacent to each other, and, in a lateral direction of the motor vehicle, at least two other of the plurality of airbags are arranged adjacent to each other, and wherein each of the plurality of airbags are individually deployable; and
    deploying, by at least one processing device, the at least one airbag.

12. The method according to claim 11, further comprising:
    inflating the at least one airbag vertically.

13. The method according to claim 11, further comprising:
    inflating the at least one airbag downward from a region located above the person.

14. The method according to claim 11, further comprising:
    deploying the at least one airbag such that it occupies approximately a same horizontal dimensions as a person.

15. The method according to claim 11, further comprising:
    determining that a horizontal acceleration acting on the motor vehicle exceeds a predetermined threshold value; and
    responsively deploying the at least one airbag.

16. The method according to claim 11, further comprising:
    determining an impending or executed predetermined driving maneuver; and
    responsively deploying the at least one airbag.

* * * * *